(12) United States Patent
Kurita et al.

(10) Patent No.: US 7,983,220 B2
(45) Date of Patent: Jul. 19, 2011

(54) WIRELESS LAN TERMINAL AND HANDOVER METHOD THEREOF

(75) Inventors: Shigeru Kurita, Kanagawa (JP); Yoshikazu Kobayashi, Kanagawa (JP)

(73) Assignee: NEC Infrontia Corporation, Tokyo (JP)

( * ) Notice: Subject to any disclaimer, the term of this patent is extended or adjusted under 35 U.S.C. 154(b) by 870 days.

(21) Appl. No.: 11/946,598

(22) Filed: Nov. 28, 2007

(65) Prior Publication Data

US 2008/0130579 A1 Jun. 5, 2008

(30) Foreign Application Priority Data

Nov. 30, 2006 (JP) ................................. 2006-324091

(51) Int. Cl.
*H04Q 7/00* (2006.01)
*H04Q 7/24* (2006.01)
(52) U.S. Cl. ........................................ 370/331; 370/338
(58) Field of Classification Search .................. 370/310, 370/328, 329, 331; 455/403, 422.1
See application file for complete search history.

(56) References Cited

U.S. PATENT DOCUMENTS

| 7,154,869 | B2* | 12/2006 | Guo et al. | 370/331 |
|---|---|---|---|---|
| 7,397,779 | B2* | 7/2008 | Chandra et al. | 370/332 |
| 7,417,971 | B2* | 8/2008 | Jeong et al. | 370/331 |
| 7,577,434 | B2* | 8/2009 | Nakano et al. | 455/436 |
| 7,668,140 | B2* | 2/2010 | Van Bemmel | 370/331 |
| 7,706,326 | B2* | 4/2010 | Marinier et al. | 370/331 |
| 7,805,140 | B2* | 9/2010 | Friday et al. | 455/436 |
| 2003/0033423 | A1 | 2/2003 | Okabe et al. | |
| 2004/0224690 | A1* | 11/2004 | Choi et al. | 455/436 |
| 2005/0135422 | A1 | 6/2005 | Yeh | |
| 2006/0062183 | A1* | 3/2006 | Forte et al. | 370/331 |
| 2008/0049702 | A1* | 2/2008 | Meylan et al. | 370/342 |
| 2008/0062933 | A1* | 3/2008 | Liu et al. | 370/332 |
| 2008/0285520 | A1* | 11/2008 | Forte et al. | 370/331 |

FOREIGN PATENT DOCUMENTS

| EP | 1398912 | 3/2004 |
|---|---|---|
| EP | 1657853 | 5/2006 |
| JP | 2001-94572 A | 4/2001 |
| JP | 2002-26931 A | 1/2002 |
| JP | 2002-359864 A | 12/2002 |
| JP | 2004-23768 A | 1/2004 |
| JP | 2004-88592 A | 3/2004 |
| JP | 2004-229225 A | 8/2004 |
| JP | 2004-266331 A | 9/2004 |
| JP | 2005-191721 A | 7/2005 |
| WO | 03077429 | 9/2003 |

* cited by examiner

*Primary Examiner* — Chi H Pham
*Assistant Examiner* — Robert Lopata
(74) *Attorney, Agent, or Firm* — Sughrue Mion, PLLC

(57) ABSTRACT

There is provided a wireless LAN terminal and a handover method thereof for resolving a sound cutoff and image cutoff which occur when a terminal is moved. The wireless LAN terminal stores BSSID of wireless LAN access points and a frame control in a MAC header of a communication frame in advance. In case of switching a wireless LAN access point for communication, the wireless LAN terminal replaces BSSID of a wireless LAN access point of a communication frame so as to continue the communication.

6 Claims, 7 Drawing Sheets

FIG.2

| WIRELESS LAN ACCESS POINT INFORMATION |
|---|
| BSSID |
| TIME STAMP |
| + ELIMINATION DUE TO TIME OUT |

20a: WIRELESS LAN ACCESS POINT INFORMATION TABLE

FIG.3

| WIRELESS LAN TERMINAL INFORMATION |
|---|
| MAC ADDRESS OF WIRELESS LAN TERMINAL |
| SECURITY INFORMATION |
| TIME STAMP |
| + ELIMINATION DUE TO STA CUTOFF<br>+ ELIMINATION DUE TO TIME OUT |

20b: WIRELESS LAN TERMINAL INFORMATION TABLE

FIG.4

| HANDOVER DESTINATION ACCESS POINT CANDIDATE |
|---|
| BSSID |
| RSSI |
| + ELIMINATION DUE TO AP NO-RESPONSE |

10: HANDOVER DESTINATION ACCESS POINT CANDIDATE TABLE

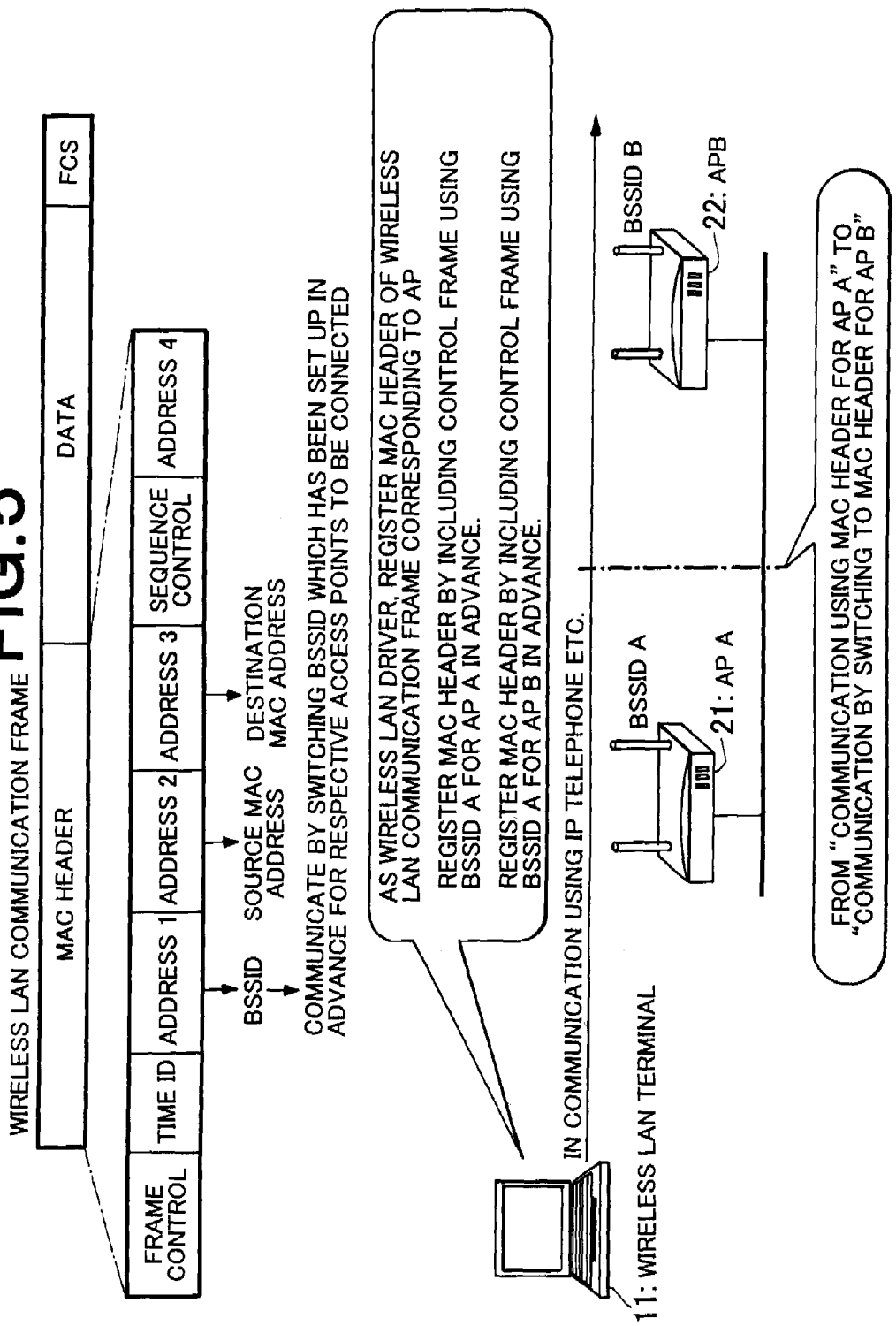

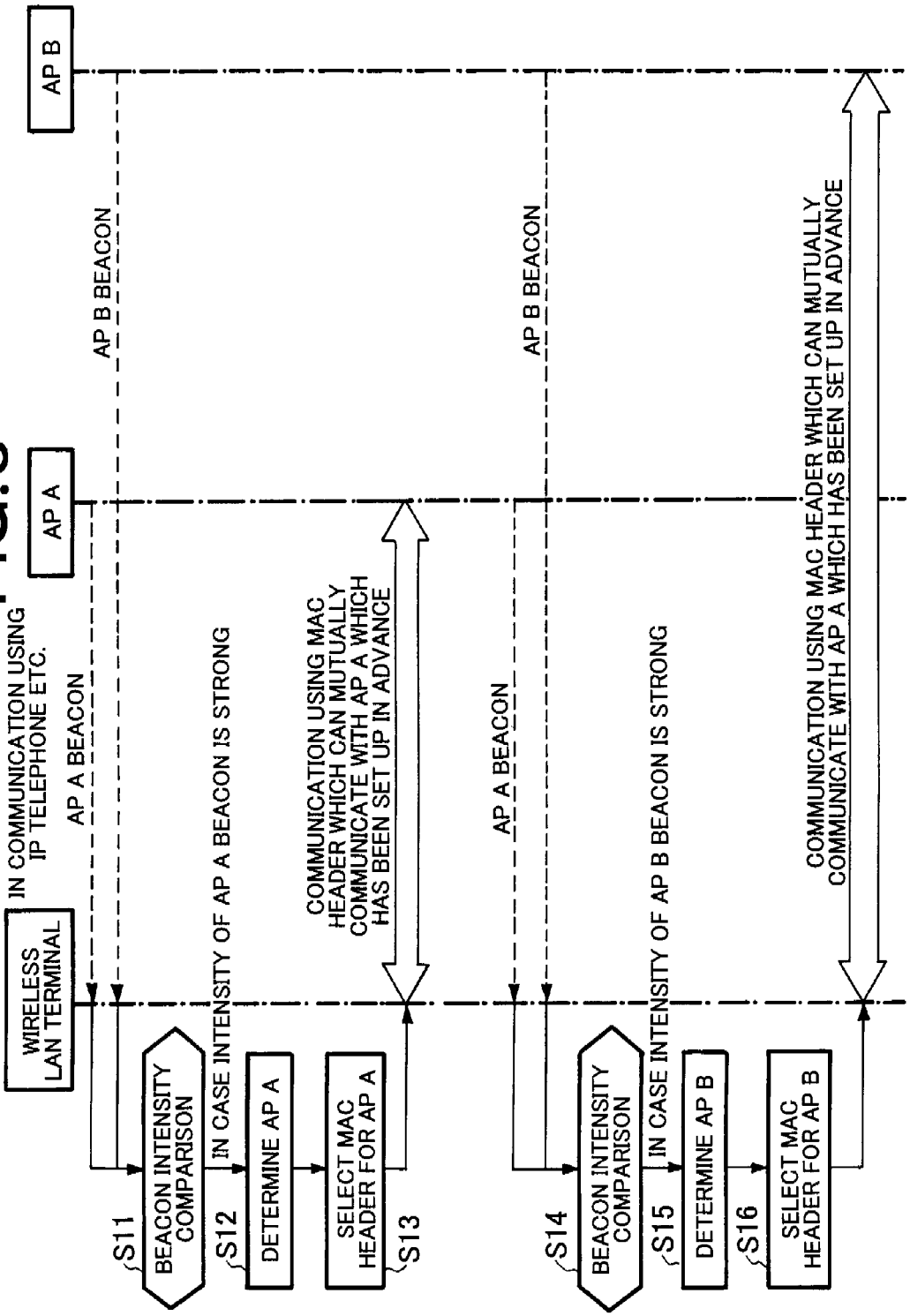

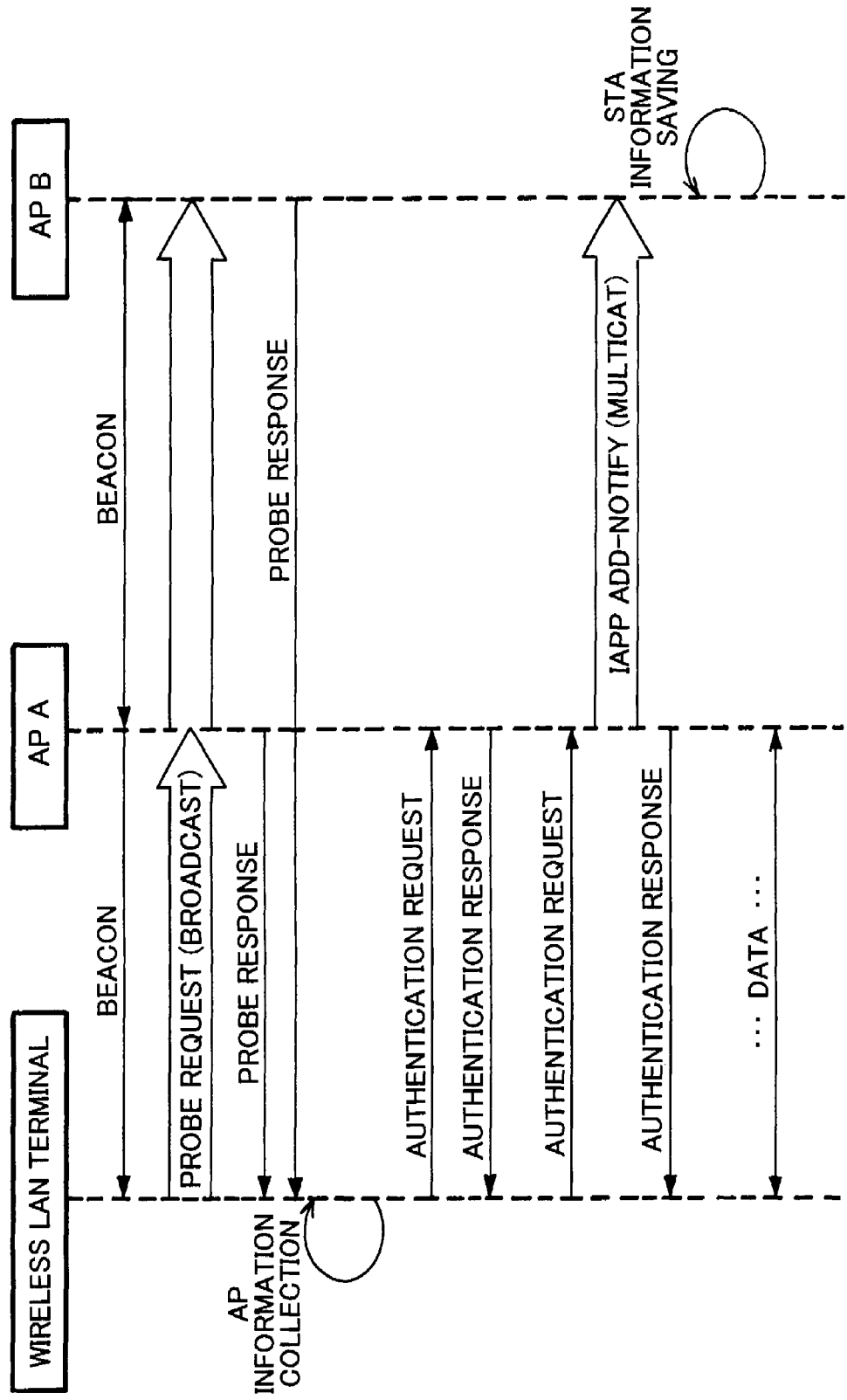

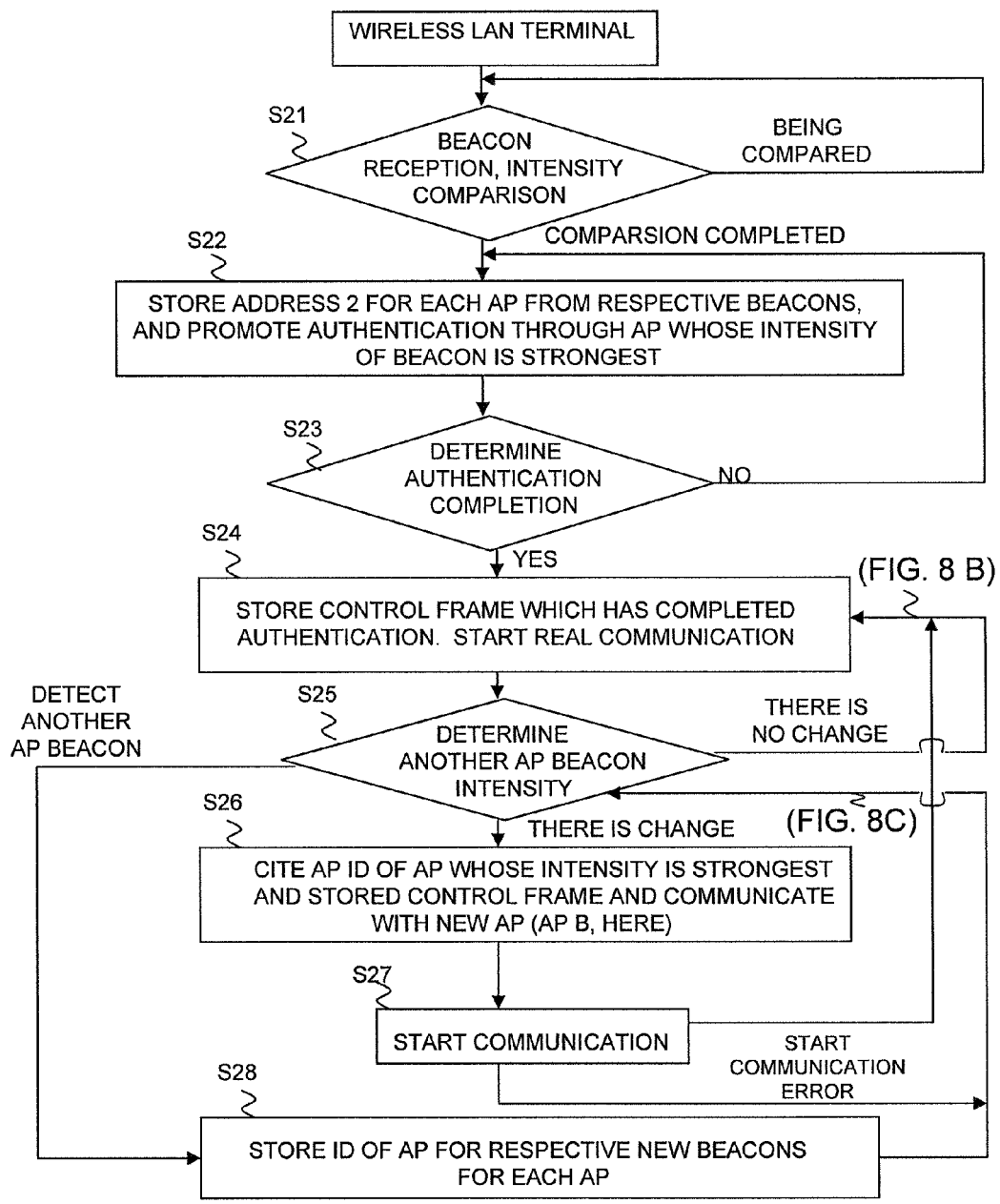

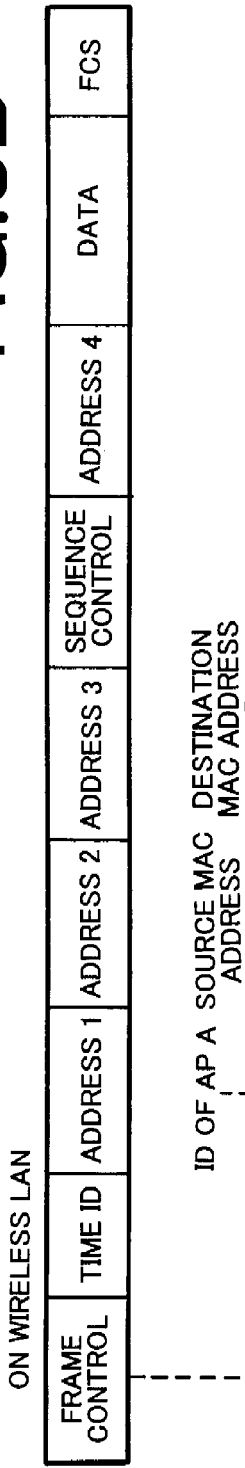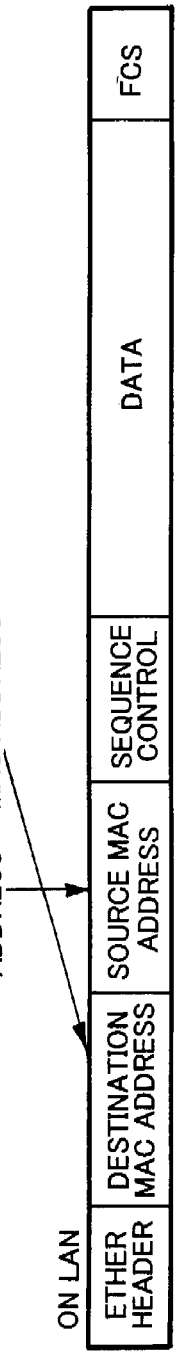

WIRELESS LAN TERMINAL AND HANDOVER METHOD THEREOF

CROSS-REFERENCE TO RELATED APPLICATIONS

This application is based upon and claims the benefit of priority from Japanese patent application No. 2006-324091, filed on Nov. 30, 2006, the disclosure of which is incorporated herein in its entirety by reference.

BACKGROUND OF THE INVENTION

1. Field of the Invention

This invention relates to a wireless LAN (Local Area Network) terminal and a handover method thereof for resolving a sound cutoff and image cutoff which occur when a terminal is moved.

2. Description of the Related Art

In a wireless LAN system, when a terminal participates in a basic service set, steps of three stages or a scanning, an authentication, and an association are performed. In case the terminal shifts from one basic service set to another basic service set with the communication being continued, the terminal connected to one base station is reconnected to another base station. In case the terminal determines that it cannot continue the communication with a base station to which the terminal is currently connected, the terminal searches for a new base station by performing the scanning and performs a reassociation.

Accordingly, when an information terminal such as a personal computer or a PDA (Personal Digital Assistant), which is connected to a wireless LAN, moves, due to the handover for switching a wireless LAN access point, the reauthentication has to be performed for the handshake.

Furthermore, there is a high speed handover method under which a cordless handset directly accesses access points capable of communicating at the periphery thereof to take in the access point information, retains the latest information of the communicable access points in a database, and takes in an access point from the communicable access points by utilizing the latest information of the database when starting the handover, which can increase the handover completion rate of the selected handover destination access point (For example, Patent Document 1: JP-A-2004-88592).

Furthermore, there is also a wireless terminal authentication method which reduces the time period required for the authentication when a wireless terminal is moved in wireless networks (For example, Patent Document 2: JP-A-2004-266331).

Meanwhile, in a wireless LAN system, when the handover is performed while a wireless LAN terminal is transmitting packets at the time of, for example, a voice communication, there may be packet loss since the authentication sequence of the wireless LAN is performed, which interrupts the data transmission.

For example, when making a video phone call using a personal computer, there is a case that the sound cutoff and image cutoff for several hundreds milliseconds or more are caused at the time of switching a wireless LAN access point. Accordingly, there are needs for resolving the sound cutoff and image cutoff brought about when a terminal is moved so as to facilitate the IP (Internet Protocol) telephone call and IP-based TV (television) conference.

SUMMARY OF THE INVENTION

In view of the above-identified circumstances, it is therefore an exemplary object of the present invention to provide a wireless LAN terminal and a handover method thereof for resolving a sound cutoff and image cutoff which occur when a terminal is moved.

To solve the above-described problems, according to an exemplary aspect of the present invention, there is provided a wireless LAN terminal including: a means for storing BSSID (Basic Service Set Identifier) for respective wireless LAN access points and a frame control in a MAC (Media Access Control) header of a communication frame in advance; and a means for, in case of switching a wireless LAN access point for communication, replacing BSSID of a wireless LAN access point of the communication frame to continue the communication.

According to an exemplary embodiment of the present invention, there is provided a handover method of a wireless LAN terminal, including: storing BSSID for respective wireless LAN access points and a frame control in a MAC header of a communication frame in advance by the wireless LAN terminal; and in case of switching a wireless LAN access point for communication, replacing BSSID of a wireless LAN access point of the communication frame to continue the communication.

BRIEF DESCRIPTION OF THE DRAWINGS

FIG. 2 shows a view indicative of an example of wireless LAN access point information;

FIG. 3 shows a view indicative of an example of wireless LAN terminal information;

FIG. 4 shows a view indicative of an example of handover destination access point candidate information;

FIG. 5 shows an explanatory diagram of the first exemplary embodiment;

FIG. 6 shows a flow chart of the first exemplary embodiment;

FIG. 7 shows a view of a participation sequence to a basic service set of a wireless LAN terminal;

FIG. 8A shows a flow chart of the second exemplary embodiment; and

FIGS. 8B and 8C show a configuration of a wireless LAN communication frame of the second exemplary embodiment.

EXEMPLARY EMBODIMENT

Figure 1:
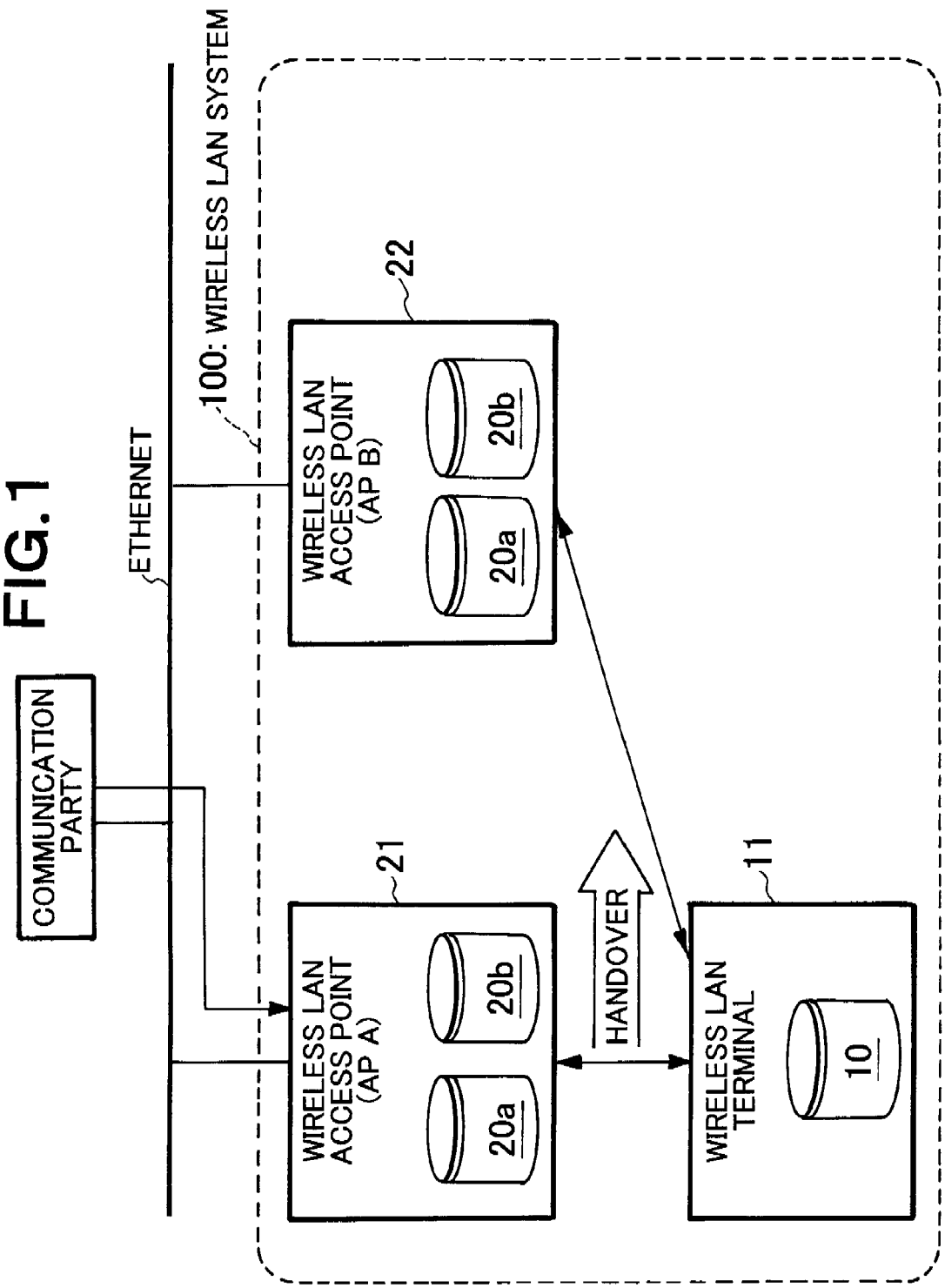
FIG. 1 shows a view of the system configuration of the present invention.

Now, exemplary embodiments of the present invention will be described in greater detail by referring to the accompanying drawings.

FIG. 1 shows the system configuration of the exemplary embodiment of the present invention. As shown, a wireless LAN system 100 conforming to the IEEE802.11 includes a wireless LAN access point (AP A) 21, a wireless LAN access point (AP B) 22, and a wireless LAN terminal 11. The wireless LAN access points 21, 22 are connected to communication parties through the Ethernet (registered trademark of Fuji Xerox Co., Ltd.). At this time, the wireless LAN terminal 11 communicates with a communication party over the Ethernet, which does not belong to the wireless LAN system 100, through the wireless LAN access point 21.

The wireless LAN access point has identical ESSID (Extended Service Set Identifier) during operation, and neighboring wireless LAN access points share a wireless LAN access point information table 20a. FIG. 2 shows an example of the wireless LAN access point information table 20a. Wireless LAN access point information includes BSSID (Basic Service Set Identifier) and a time stamp of the access point. The time stamp represents the time when the access point is registered in the wireless LAN access point information table.

Furthermore, the respective wireless LAN access points share a wireless LAN terminal information table 20b which has been authenticated in advance. FIG. 3 shows an example of the wireless LAN terminal information table 20b. Wireless LAN terminal information includes a MAC (Media Access Control) address, security information, and a time stamp of the terminal. The time stamp represents the time when the terminal is registered in the wireless LAN terminal information table.

The wireless LAN terminal 11 has a handover destination wireless LAN access point candidate information table 10. FIG. 4 shows an example of the handover destination wireless LAN access point candidate information table 10. Wireless LAN access point information includes BSSID and RSSI (Receive Signal Strength Indicator) of the access point.

First Exemplary Embodiment

FIG. 5 shows an explanatory diagram of the first exemplary embodiment according to the present invention. A wireless LAN communication frame is configured by a MAC header, data, and FCS (Frame Check Sequence). The MAC header is configured by a frame control, time ID, address 1, address 2, address 3, sequence control, and address 4.

The frame control is configured by a protocol version, type/subtype, TODS/FromDS (To Distribution System/From Distribution System), MoreFragment, retry, power management, MoreData, WEP (Wired Equivalent Privacy), and order.

The time ID describes the transmission estimated time of the self terminal. The sequence control is configured by a sequence number and fragment number. The contents of the address field to be used are different depending on the transmission mode. For example, under the infrastructure mode of terminal access point, the address 1 is a MAC address (BSSID) of the access point, the address 2 is a source MAC address, and the address 3 is a destination MAC address. The address 4 is used for the communication between the access points.

The wireless LAN terminal 11 stores the MAC header which includes the BSSID for the respective wireless LAN access points (access points, hereinafter) which can perform communication with the authentication omitted and has been setup in advance and the frame control of the communication frame in a wireless LAN driver. Accordingly, even if an access point for the communication is switched, the communication can be continued only by replacing the BSSID of the MAC header of the wireless LAN communication frame (MAC address of access point).

The MAC header for the respective access points is not restricted to the configuration of being included in the wireless LAN driver, and may be included in a management application etc.

Furthermore, the MAC header which has been setup in advance may be stored together with an encryption key which has been matched in advance such as a WEP key.

Accordingly, the MAC header which has completed the pre-authentication including the encryption can be generated from the beginning, which can perform the communication by omitting not only the access point authentication but also the authentication of the encryption and authentication phase with an upper authentication server.

Referring to FIG. 6, switching of an access point will be explained specifically.

Here, which MAC header of the respective access points registered in advance is used is determined by the intensity of the beacon (step S11).

Firstly, since the beacon of an access point A is intensive (step S12), the communication is started using the MAC header of the access point A (step S13).

Then, the intensity of the beacon is determined again (step S14), and, in case the intensity of the beacon of the access point B is more intensive than that of the beacon of the access point A (step S15), the MAC header is switched to that of the access point B (step S16), continuing the communication.

The intensity of the beacon between access points is not restricted to the comparison by a constant value, which may be a threshold value provided with a hysteresis. That is, by comparing the intensities of the beacons, the threshold value to switch the access point from the access point A to access point B is set different from the threshold value to switch the access point from the access point B to access point A, and these threshold values are made to have a hysteresis, which can prevent the switching from occurring frequently in case the value of the beacon of the access point A is close to the value of the beacon of the access point B.

Furthermore, not only the beacon but also the synchronization communication speed, real communication density, packet scrappage rate may be added in performing the comparison.

Second Exemplary Embodiment

In the second exemplary embodiment, registering a frame which has been set up in advance is unnecessary with respect to the first exemplary embodiment.

FIG. 7 shows a participation sequence to a basic service set of a wireless LAN terminal. Regardless of whether the wireless LAN terminal is stored in an access point or not stored in an access point, the wireless LAN terminal collects RSSI being a Beacon message transmitted from an arbitrary access point, and a Probe Response message transmitted from an access point corresponding to the Probe Response message transmitted from the wireless LAN terminal, and stores the messages in the handover destination access point candidate information table so as to collect information of an access point of the handover destination.

When the wireless LAN terminal transmits an Authentication Request, and the access point A returns an Authentication Response, the wireless LAN terminal is stored in the access point A, and the access point A generates the wireless LAN terminal information. Furthermore, the wireless LAN terminal transmits an Association Request, and the access point A returns an Association Response and multicasts the wireless LAN terminal information using an IAPP (Inter-Access Point Protocol) Add-notify of the IEEE802.11f.

The access point B saves the received wireless LAN terminal information. The wireless LAN terminal and access point A start transmitting and receiving data.

While the wireless LAN terminal is stored, the access point A periodically transmits the wireless LAN terminal information to the access point of the identical ESSID stored in the wireless LAN access point information table.

When receiving the wireless LAN terminal information from the access point A, in case the identical wireless LAN terminal information has not been stored in the self storage device, the access point B records the received wireless LAN terminal information.

FIG. 8A shows a flow chart of the handover in this exemplary embodiment, and FIGS. 8B and 8C show a configuration of a wireless LAN communication frame.

In FIG. 8A, firstly, the wireless LAN terminal collects the beacons from the respective access points, and compares the intensities thereof (step S21). Then, the wireless LAN terminal forms a table in which the existence of the access points and the BSSID of the access points are registered from the beacon information (step S22).

Next, the authentication is completed through an access point whose beacon is the most intensive (step S23). Then, a frame control which has completed the authentication is stored (step S24). The frame control performs the registration to be used without change with respect to the plural access points.

Furthermore, the beacons are collected and the intensities thereof are compared (step S25), and, in case there is no change, the communication with an access point which is in communication is continued. In case another beacon is detected, the BSSID of an access point of the new beacon is stored (step S28).

After comparing the intensities of the beacons, if it is determined that the access point of the communication party should be changed, the BSSID of the access point is replaced with the address 1 of the MAC header of the wireless LAN communication frame (see FIGS. 8B and 8C), and the frame control including authentication information is used without change (step S26). Thus, saving the labor of performing the authentication for the respective access points.

In the communication on a wired LAN, since the frame control of the wireless LAN and the BSSID of the access point are deleted, a terminal on the wired LAN connected to the access point receives the same LAN frame from the access point A as well as the access point B. Accordingly, the terminal on the wired LAN can continue the communication without focusing on switching the access point, generating no temporary cutoff in the authentication etc.

Switching the access point is not restricted to the beacons. As described above, the real wireless communication states may be compared.

By setting the MAC header on the wired LAN to the starting point, even if the access point is changed, an authentication server on the wired LAN can take over the authentication without change.

In case a RADIUS server etc. distributes a WEP key to the initial authentication access point, a destination access point may receive the representative transfer from the initial access point to continue the communication.

The access point B collates, without performing the Reassociation, the MAC address of a data packet transmitted from the wireless LAN terminal with the wireless LAN terminal information table, and, in case a time stamp of the corresponding wireless LAN terminal information is not older than a predetermined elapsed time, and the security information corresponds with information of the access point B, the access point B allows a packet to pass through to the communication party of the wireless LAN terminal.

In case the access point B collates, without performing the Reassociation, the MAC address of a data packet transmitted from the wireless LAN terminal with the wireless LAN terminal information table, and determines that the time stamp is older than a predetermined elapsed time, the access point B transmits a Disassociation packet to the wireless LAN terminal to cut off the communication.

In case the access point B collates, without performing the Reassociation, the MAC address of a data packet transmitted from the wireless LAN terminal with the wireless LAN terminal information table, and determines that the security information is abnormal, the access point B transmits a Disassociation packet to the wireless LAN terminal to cut off the communication.

When receiving the Disassociation packet from the access point B, the wireless LAN terminal assumes that the communication cannot be performed with the communication party through the access point B, and performs the Association processing again with the access point B to enable the connection.

In case the wireless LAN terminal fails in the handover to the access point B, when the Association is performed again, since the packet loss occurs here, the communication through the access point A may be continued without performing the Association again with the access point B.

The access point B can notify that the handover is completed by detecting the success information in the handover from the wireless LAN terminal, and transmitting a Move-notify message of IAPP to an access point of the identical ESSID.

In case an access point stored in the wireless LAN access point information table does not respond due to the cutoff from a network etc., the access point collates the MAC address of the access point which does not respond to discard the MAC address from the storage device.

When the time stamp included in the wireless LAN terminal information table, which has been stored in advance, exceeds a predetermined threshold value, the access point discards the wireless LAN terminal information from the storage device.

In case an access point included in the collected handover destination access point candidate table does not respond to the search of the access point, the wireless LAN terminal discards the access point information from the storage device.

In an exemplary embodiment of the present invention, the wireless LAN terminal may further include: means for collecting beacons from wireless LAN access points, and forming a table in which BSSID of wireless LAN access points is registered from the beacon information; and means for completing an authentication through one of wireless LAN access points, and storing a frame control which has completed the authentication.

The wireless LAN terminal may further include: a wireless LAN driver; and means for storing a MAC header including BSSID for the respective wireless LAN access points and a frame control of a communication frame in the wireless LAN driver.

In an exemplary embodiment of the present invention, the handover method may further include: collecting beacons from wireless LAN access points, and forming a table in which BSSID of wireless LAN access points is registered from the beacon information by the wireless LAN terminal; and completing an authentication through one of wireless LAN access points, and storing a frame control which has completed the authentication.

The handover method may further include: storing a MAC header including BSSID for the respective wireless LAN access points and a frame control of a communication frame in a wireless LAN driver by the wireless LAN terminal.

According to an exemplary embodiment of the present invention, there is provided a wireless LAN access point configured to communicate with the wireless LAN terminal according to any one of the above-mentioned exemplary embodiments.

According to an exemplary embodiment of the present invention, there is provided a wireless LAN system including: the wireless LAN terminal according to any one of the above-mentioned exemplary embodiments; and a wireless LAN access point configured to communicate with the wireless LAN terminal.

According to an exemplary embodiment of the present invention, there is provided a wireless LAN handover system which includes: a plurality of wireless LAN access points having identical ESSID; and a wireless LAN terminal. In the embodiment, the plurality of wireless LAN access points share wireless LAN terminal information which has been authenticated in advance. When performing the handover from a wireless LAN access point which is in communication, to another wireless LAN access point, the wireless LAN terminal transmits a packet to a wireless LAN access point of the handover destination by rewriting a MAC address of a wireless LAN access point of a MAC header of a data transmission frame. In case the wireless LAN terminal information shared in advance and the source of the packet correspond with each other, the wireless LAN access point of the handover destination makes the packet pass through without performing the reauthentication.

The wireless LAN access point compares a MAC address and security information of a wireless LAN terminal in a MAC header of a communication frame transmitted from the wireless LAN terminal and wireless LAN terminal information which has been shared in advance, and makes a packet pass through in case they correspond with each other.

When a time stamp included in wireless LAN terminal information, which has been stored in advance, exceeds a predetermined threshold value, the wireless LAN access point discards the wireless LAN terminal information from a storage device.

Furthermore, according to an exemplary embodiment of the present invention, there is provided a handover method of a wireless LAN terminal among a plurality of wireless LAN access points having identical ESSID. In the embodiment, the plurality of wireless LAN access points share wireless LAN terminal information which has been authenticated in advance. When performing the handover from a wireless LAN access point which is in communication, to another wireless LAN access point, the wireless LAN terminal transmits a packet to a wireless LAN access point of the handover destination by rewriting a MAC address of a wireless LAN access point of a MAC header of a data transmission frame. In case the wireless LAN terminal information shared in advance and the source of the packet correspond with each other, the wireless LAN access point of the handover destination makes the packet pass through without performing the reauthentication.

The wireless LAN access point compares a MAC address and security information of a wireless LAN terminal in a MAC header of a communication frame transmitted from the wireless LAN terminal and wireless LAN terminal information which has been shared in advance, and makes a packet pass through in case they correspond with each other.

When a time stamp included in wireless LAN terminal information, which has been stored in advance, exceeds a predetermined threshold value, the wireless LAN access point discards the wireless LAN terminal information from a storage device.

That is, according to the exemplary embodiment of the present invention, at the time of the handover of a wireless LAN terminal which communicates and moves among a plurality of wireless LAN access points, a MAC address of a wireless LAN access point which has been set up in advance is automatically selected, and the time period for the handshake is omitted, which can continue the communication even among different access points without cutting off the communication.

The above-described configuration enables a wireless LAN terminal communication or the stream reproduction, TV conference, IP telephone call while moving, without raising a temporary cutoff.

According to the exemplary embodiment of the present invention, when a wireless LAN terminal moves among a plurality of wireless LAN access points, the packet loss which occurs when the handover is performed while data is transmitted can be suppressed.

Furthermore, by utilizing that a communication frame on a wired LAN is not changed, even if a wireless LAN access point is switched, a temporary cutoff of communication can be reduced by omitting the troublesome task of the center authentication, such as switching control for wireless LAN access points on a wired LAN, and individual authentication for respective wireless LAN access points. Thus, it is possible to realize the IP telephone call, TV conference, etc. in a comfortable environment.

Furthermore, it becomes possible to reduce the deterioration of viewing and listening quality such as a reproduction cutoff which is caused when the buffer for streaming contents comes close to zero due to a temporary cutoff of communication.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A wireless local area network (LAN) system, comprising:
   a wireless LAN terminal; and
   a plurality of wireless LAN access points each having an identical ESSID (Extended Service Set Identifier) and sharing wireless LAN terminal information that comprises a MAC address, security information and a time stamp of the wireless LAN terminal which has been authenticated,
   wherein said wireless LAN terminal
   stores a MAC (Media Access Control) header of a communication frame that includes a BSSID (Basic Service Set Identifier) for said each of said plurality of wireless LAN access points, wherein said each of said plurality of wireless LAN access points is configured to communicate with the wireless LAN terminal without requiring authorization when any one of said plurality of wireless LAN access points has been authorized, and
   a frame control for which said advance authorization with said any one of said plurality of wireless LAN access points has been completed, and
   further wherein,
   in case of switching from a first wireless LAN access point of said plurality of wireless LAN access points to a second wireless LAN access point of said plurality of wireless LAN access points, said wireless LAN terminal replaces, in the MAC header of the communication frame to be transmitted, a first BSSID of a said first wireless LAN access point with a second BSSID of said second wireless LAN access point, using said frame control without change with respect to the plurality of LAN access points, in the communication frame to be transmitted, and continues communication without requiring authentication.

2. The wireless LAN system according to claim 1, wherein said wireless LAN terminal:
   collects beacons from said plurality of wireless LAN access points, and forms a table in which a BSSID for each of said plurality of wireless LAN access points is registered from information related to said beacons; and
   completes an authentication through said one of said plurality of wireless LAN access points, and stores said frame control of said MAC header of said communication frame for which advance authorization with said any one of said plurality of wireless LAN access points has been completed.

3. The wireless LAN system according to claim 1, wherein said wireless LAN terminal
   comprises a wireless LAN driver, and said wireless LAN terminal
   stores a MAC header including a BSSID for said each of said plurality of wireless LAN access points and said frame control of said communication frame in the wireless LAN driver.

4. A handover method of a wireless LAN terminal, comprising:
   storing a MAC (Media Access Control) header of a communication frame including a BSSID (Basic Service Set Identifier) for each of a plurality of wireless LAN access points, said plurality of wireless access points configured to perform communication with the wireless LAN terminal without requiring authorization when any one of said plurality of wireless LAN access points has been authorized, and a frame control for which said authorization with said any one of said plurality of wireless LAN access points has been completed, wherein said plurality of wireless LAN access points have identical ESSID (Extended Service Set Identifier) and share wireless LAN terminal information which includes a MAC address, security information and a time stamp of the wireless LAN terminal which has been authenticated; and
   in case of switching from a first of said plurality of wireless LAN access points to a second of said plurality of wireless LAN access points, replacing, in the MAC header of the communication frame to be transmitted, a first BSSID of said first wireless LAN access point with a second BSSID of said second wireless LAN access point, using said frame control without change, in the communication frame to be transmitted, and continuing communication without requiring authentication.

5. The handover method of a wireless LAN terminal according to claim 4, further comprising:
   collecting beacons from said plurality of wireless LAN access points, and forming a table in which said BSSID for each of said plurality of wireless LAN access points is registered from beacon information by the wireless LAN terminal; and
   completing an authentication through one of said plurality of wireless LAN access points, and storing a frame control of the MAC header of the communication frame for which said authorization with said any one of said plurality of wireless LAN access points has been completed.

6. The handover method for a wireless LAN terminal according to claim 4, further including:
   storing a MAC header including said BSSID for each of said plurality of wireless LAN access points and said frame control of said communication frame in a wireless LAN driver.

* * * * *